July 26, 1966　　F. F. JOHNSON ETAL　　3,263,083
HIGH RESOLUTION APPARATUS USING A GAMMA RAY SOURCE
AND DETECTOR FOR INVESTIGATING EARTH FORMATIONS
Filed Oct. 20, 1958　　　　　　　　　　　　　　　7 Sheets-Sheet 1

INVENTORS
FRANK F. JOHNSON
JAY TITTMAN
BY
THEIR ATTORNEYS

July 26, 1966 F. F. JOHNSON ETAL 3,263,083
HIGH RESOLUTION APPARATUS USING A GAMMA RAY SOURCE
AND DETECTOR FOR INVESTIGATING EARTH FORMATIONS
Filed Oct. 20, 1958 7 Sheets-Sheet 2

INVENTORS
FRANK F. JOHNSON
JAY TITTMAN
BY
Brumbaugh, Free, Graves & Donohue
THEIR ATTORNEYS

INVENTORS
FRANK F. JOHNSON
JAY TITTMAN
BY
THEIR ATTORNEYS

United States Patent Office 3,263,083
Patented July 26, 1966

3,263,083
HIGH RESOLUTION APPARATUS USING A GAMMA RAY SOURCE AND DETECTOR FOR INVESTIGATING EARTH FORMATIONS
Frank Fawcett Johnson and Jay Tittman, Danbury, Conn., assignors to Schlumberger Well Surveying Corporation, Houston, Tex., a corporation of Texas
Filed Oct. 20, 1958, Ser. No. 768,164
19 Claims. (Cl. 250—83.6)

This invention relates to apparatus for investigating the earth formations traversed by a well or borehole and, more particularly, pertains to new and improved apparatus of the type including a source for irradiating the formations with gamma radiation and a detector for obtaining indications of gamma radiation affected by the formation.

This application is a continuation-in-part of copending application Serial No. 441,064, filed July 2, 1954, now Patent No. 2,944,148 issued July 5, 1960, by the same inventors and having a common assignee.

Recent investigations have revealed that information concerning the density of earth formations is of great utility. For example, where the grain density and interstitial fluid density of a formation are known, a density log may be converted directly to a total porosity log. The latter characteristic, of course, is useful in estimating the reservoir capacity of hydrocarbon-containing formations.

Moreover, density is of interest as a factor influencing seismic velocity. This is understandable since a better knowledge of subsurface densities may permit improved interpretation of seismic surveys.

In addition, density information aids the interpretation of gravity surveys inasmuch as the depths of formations exhibiting gravitational anomalies are usually difficult to determine with present techniques.

Apparatus has been proposed for obtaining a log of formation density utilizing a source of gamma radiation and a gamma ray detector. In the United States patent to Russell No. 2,469,461, for example, apparatus for investigating earth formations at short range, i.e., less than one inch from the borehole wall, includes a relatively high energy gamma ray source and a detector spaced at minimum distance from the source. As will be shown hereinafter however, the prevision of these measurements is too low to be of any great utility in the applications enumerated hereinbefore.

It is, therefore, an object of the present invention to provide new and improved logging apparatus utilizing gamma radiation for determining formation density with greater precision than heretofore possible.

Another object of the invention is to provide logging apparatus capable of determining formation density at relatively large distances from the wall of a borehole.

Apparatus in accordance with the present invention for investigating earth formations traversed by a well or borehole comprises an instrument adapted to be passed through a borehole. The instrument includes a wall-engaging face and means are provided for maintaining the wall-engaging face in engagement with the sidewall of the borehole. A source of gamma radiation is supported within the instrument in the vicinity of a wall-engaging face. The apparatus further comprises a detection system including a gamma-ray-responsive device supported within the instrument in the vicinity of the wall-engaging face, and longitudinally spaced from the source relative to the axis of the borehole. According to the invention, improved sensitivity to density variations and therefore high density resolution is obtained by utilizing a relatively low energy gamma ray source and a large source-detector spacing.

The novel features of the present invention are set forth with particularity in the appended claims. The present invention, both as to its organization and manner of operation, together with further objects and advantages thereof, may best be understood by reference to the following description taken in connection with the accompanying drawing in which:

Figure 1A:
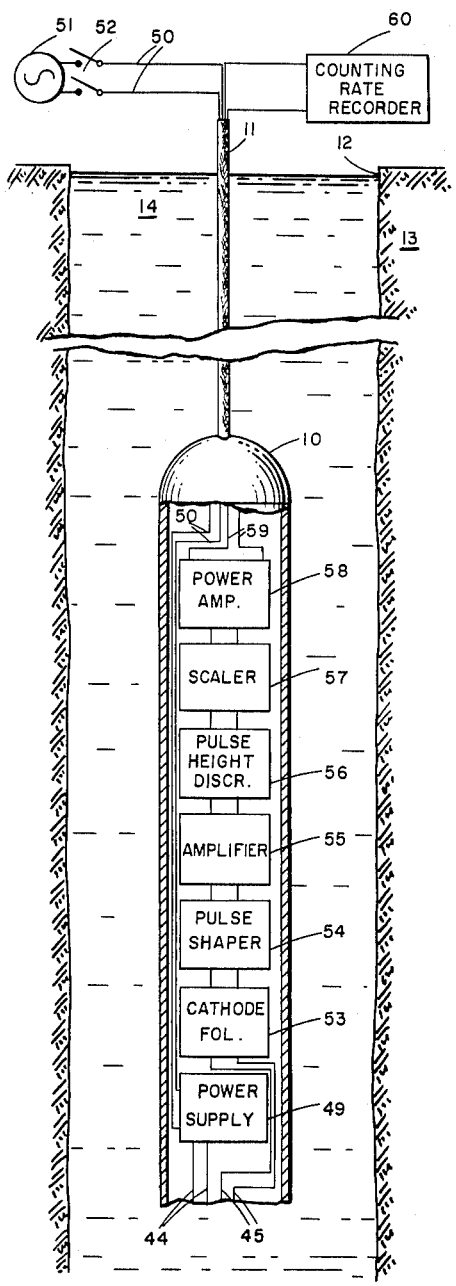
FIGS. 1A and 1B represent the upper and lower sections, respectively, of well logging apparatus constructed in accordance with the present invention shown in operative association with a borehole, certain details of FIG. 1A being shown schematically.

As shown in FIG. 1A of the drawings, the well logging apparatus embodying the present invention comprises a housing 10 suspended by an armored cable 11 in a borehole 12 traversing earth formations 13 and which may be filled with a drilling liquid 14, such as a water base or oil base mud. The cable 11 may be employed in association with a winch (not shown) to lower and raise housing 10 in the borehole in a customary manner.

Figure 1B:
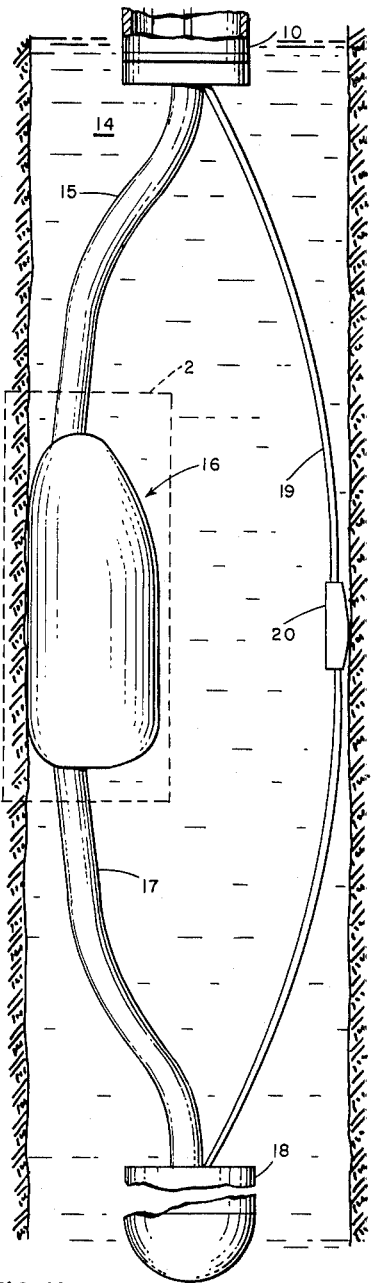

Housing 10 is of conventional pressure-resistant construction to protect various electronic circuits, to be described hereinafter, from the drilling mud 14. The lower end of housing or electronic cartridge 10 is connected to a tubular support 15, represented in FIG. 1B, having a compound curve configuration so that it extends downwardly and toward the sidewall of the borehole. Attached to support 15 is another generally-cylindrical instrument or wall-engaging "skid" 16 connected by an integral extension 17 of tube 15 to a weighted member 18. Tube portion 17 is of a curved configuration similar to portion 15, but it extends downwardly and away from the sidewall of the borehole.

Cartridge 10 and weight 18 are connected together by a conventional bowed spring 19 provided with a sidewall-engaging shoe 20. The curvature and resilience of spring 18 are arranged in a known manner so that a wall-engaging face 21 of instrument 16 is maintained in engagement with the sidewall of borehole 12 as the assembly traverses the borehole.

Figure 2:
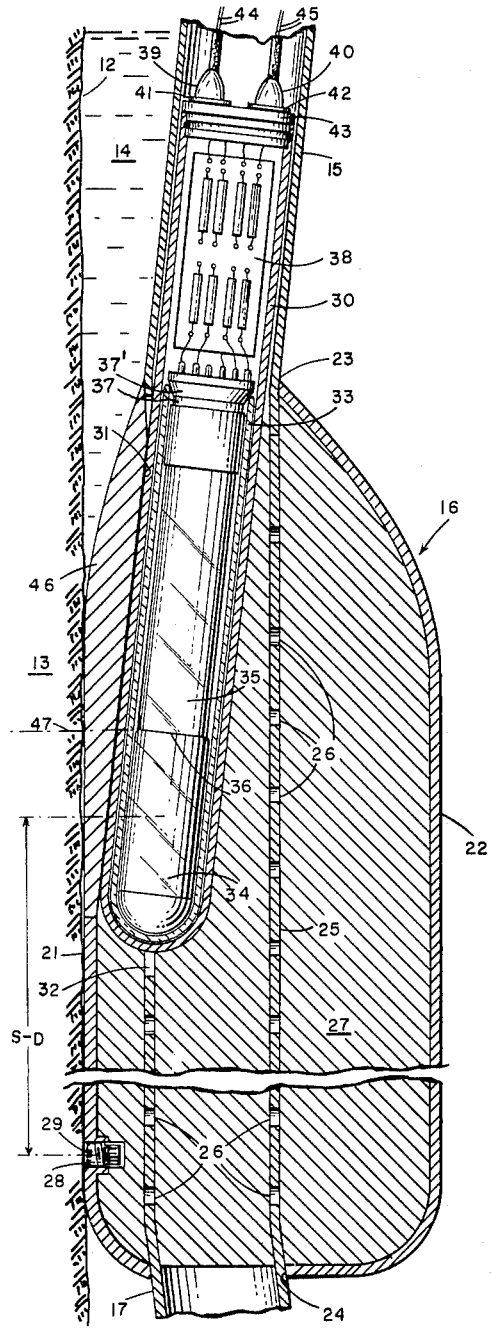
FIG. 2 is an enlarged view in longitudinal cross-section of a portion of FIG. 1B outlined by rectangle 2.

With reference now to FIG. 2, instrument 16 is comprised of a thin-walled steel container or housing 22 having upper and lower openings 23 and 24 which conform to the diameters of tube portions 15 and 17. These tube portions are integrally connected by a tube 25 which extends longitudinally through pad 16 in essentially parallel relation to face 21. Tube 25 is provided with a plurality of openings so that molten lead may be introduced and thus the lead, after it solidifies, forms a gamma ray shield 27 which essentially fills the container 22 as well as tube portion 25. Of course, other shield materials of high density and high atomic number may be employed. In addition, if desired, tube portion 25, as well as portions 15 and 17, may be constructed of a material substantially impervious to gamma radiation, as an alloy of tungsten, copper, and nickel, commonly referred to under the trade names Hevimet or Mallory 1000.

A threaded opening or recess 28 is provided in the vicinity of the lower end of sidewall-engaging face 21. This opening receives the entirety of a pellet of suitable radioactive material recessed from the face 21 toward the center of the skid 16 about one-half inch or more but no more than about two inches as described hereinafter, or, as shown, of a screw 29 composed of suitable material previously made radioactive by conventional techniques. As pointed out below, the radioactive material should be a source of gamma radiation, preferably within a selected low energy range, and thus the apparatus embodying the invention includes a source for irradiating earth formations 13 with gamma rays.

The apparatus further includes a detection system for obtaining a log of the gamma radiation affected by the earth formations. A portion of the detection system is contained by an aluminum pressure housing 30 received by an opening or bore 31 in shield 27 of pad 16 that is aligned at its upper end with opening 23. In order to bring a portion of the detection system, to be later described, in close association with the sidewall of the borehole 12 and yet keep the longitudinal length of sidewall-engaging face at a minimum, bore 31 is tilted relative to a longitudinal line of face 21 in a direction toward the axis of borehole 12, and a cut out 32 is provided in the front face of tube portion 25 to accommodate this tilt. Housing 30 may be considered as an extension of instrument 16, and to receive a portion of housing 30 which projects out of opening 23, tube 15 is aligned, in part, with bore 31.

Supported within housing 30 by appropriate resilient means (not shown) is a conventional twin-walled Dewar flask 33. A scintillation element 34, such as a cylindrical crystal of sodium iodide, is disposed at the lower end of Dewar flask 33 and by virtue of the tilt of bore 31 is positioned relatively closely to face 21. Also disposed within flask 33 is a conventional photomultiplier tube 35 having its end window 36 optically coupled to the crystal 34. The Dewar flask 33 thermally insulates both crystal 34 and photomultiplier 35 from drilling mud 14 thereby minimizing any detrimental effects which may result from high temperatures sometimes encountered in a borehole.

Electrical connections to the photomultiplier may be completed by means of a socket 37 included in an end closure 37' for the Dewar flask. Circuit elements for use with the photomultiplier are supported on a chassis 38 disposed above closure 37'.

Electrical connectors 39 and 40 are associated with corresponding sockets 41 and 42 of a cap 43 which closes housing 30. Thus, electrical input and output conductors 44 and 45 may be connected to the photomultiplier circuit, although housing 30, together with its cap 43, constitutes a pressure-resistant container.

To displace drilling mud 14 from in front of scintillation element 34, the upper front portion of container 22 and shield 27 are cut away to receive a member 46 that is essentially transparent to gamma rays. For example, mud displacer 46 may be constructed of aluminum and is so formed that it conforms to the cylindrical configuration of wall-engaging face 21. That is, below a horizontal plane, represented by dash line 47 and defined by the uppermost extremity of scintillation element 34, member 46 functions as an essentially straight continuation of face 21 thereby to minimize the amount of drilling mud that may come between the face and the sidewall of the borehole. However, in order to keep the wall-engaging face 21 as short as possible to facilitate good wall contact, member 46 curves gradually above plane 47 and provides a smooth transition at its junction with tube 15. The configuration of member 46 may be best appreciated from an examination of the perspective representation in FIG. 3, which shows it to have a semi-cylindrical inner face 48 which corresponds to the shape of housing 30.

The longitudinal distance between the geometric centers of source 29 and detector crystal 34, denoted in FIG. 2 by the characters S–D, is selected to provide a desired operating characteristic. The manner in which this S–D spacing is determined will be apparent from a discussion to be presented hereinafter.

Referring once again to the electronic cartridge 10 illustrated in FIG. 1, power conductors 44 for the photomultiplier circuit are connected to a power supply 49 which is energized via insulated conductors 50 of cable 11 by a power source 51 at the surface of the earth provided with an operating switch 52.

The pulse signal from the photomultiplier is supplied over conductors 45 to a cathode follower 53, employed for its characteristically high input impedance and low output impedance coupled to a pulse shaper 54. Pulse shaper 54 may, for example, be a delay line, for deriving pulses of proportional height but of reduced duration compared to the pulses applied to it. The shaper 54 is coupled to an amplifier 55, in turn, coupled to a pulse height discriminator 56 adjusted so that pulses of relatively low amplitudes usually caused by extraneous dark current of the photomultiplier 35 are not applied to the succeeding stage which in this case is a scaler 57. The scaler is employed since counting rates of the order of $10^4$ counts per second are required in order to realize, in practice, the accuracy inherent in this device, and conventional cables do not readily transmit pulses at this rate at low power. The scaler is coupled to a power amplifier 58 connected by insulated conductors 59 of cable 11 to a counting rate recorder 60 at the surface of the earth in which the recording medium is displaced in proportion to movement of instrument 16 in the borehole. Thus, a continuous log of counting rate versus depth may be obtained.

Circuit elements 49, 53, 54, 55, 56, 57, 58 and 60 may be of conventional construction and thus they need not be described in detail.

In operation, the assembly including housing 10, instrument 16 and the associated elements is lowered into borehole 12 below the formations to be logged. Switch 52 is closed and the assembly is raised at a normal logging speed, while spring 19 maintains face 21 of instrument 16 in engagement with the sidewall of the borehole. Gamma radiation from source 29 irradiates the formations and after being affected by formation material some of this gamma radiation is intercepted by scintillation crystal 34. As is well-known, crystal 34 operates as a gamma ray transducer and in response to each quantum of incident gamma radiation, a pulse of light is derived having an energy content proportional to the gamma ray energy dissipated in the crystal. The rate of occurrence of such pulses is dependent on the flux of gamma radiation. Each such light pulse is converted to an amplified pulse of electrical energy, the amplitude of which is proportional to the energy of the light pulse, by the photomultiplier 35 and thus a succession of pulses is supplied via cathode follower 53 to pulse shaper 54. The pulses, after a reduction in duration in shaper 54, are amplified in stage 55 and applied via discriminator 56 to scaler 57. The counting rate of the pulses supplied by the scaler to amplifier 58, of course, is proportional to the counting rate of the pulses developed by photomultiplier 35. The counting rate recorded by unit 60 as a function of depth in the borehole represents the gamma ray flux incident on scintillation element 34. As will be more apparent from the following discussion, the intercepted gamma ray flux is a measure of formation density, and therefore, a density log is obtained by means of the apparatus embodying the present invention.

The principles of operation and the manner of selecting the best mode of carrying out the present invention may be best appreciated in view of certain theoretical and experimental considerations. These considerations, although useful in the practice of the invention, should not be deemed as in any way limiting its scope.

In general, gamma rays below an energy of approximately 0.1 million electron volts (mev.) interact with matter in a process which eliminates the gamma rays, known as the photoelectric effect. Another process which takes place is known as the Compton effect whereby the energy of each gamma ray is reduced and its direction is changed. The probability of a Compton interaction within a given volume of matter depends on the energy of the gamma ray and on the number of electrons per cubic centimeter, usually referred to as the electron density. The probability of photoelectric interaction depends on the gamma ray energy, on the number of atoms per cubic centimeter, and on the type of atoms present. The foregoing factors suggest that gamma rays may be used to determine the electron density of subsurface formations and also to indicate the type and density of atoms present, depending upon the gamma ray energy of the source used.

One method of measuring electron density of a formation is to use the formation as a gamma ray reflector. For example, a source of gamma radiation and a very closely spaced gamma ray detector may be employed. Gamma radiation from the source is Compton-scattered and some of the scattered gamma rays are intercepted by the detector. It has been observed that in this arrangement, the intercepted gamma ray flux varies directly with electron density. However, experiment has shown that the depth of investigation of the short or zero spacing source and detector is impractically small for borehole logging purposes.

On the other hand, by using apparatus constructed in accordance with the present invention, wherein a relatively large source-detector spacing is employed, electron density is measured through the use of the formation as both scatterer and absorber. As the electron density of the medium under investigation increases, the amount of gamma radiation that is absorbed increases. Thus the gamma ray flux at the detector is, in general, inversely related to the electron density of the formations.

It is evident that both scattering and absorption, which increase together, are involved in large source-detector spacing apparatus. Because of this, electron density is a double-valued function of counting rate, in turn, representative of intercepted gamma ray flux. A very dense formation exhibits a large absorption and a very tenuous formation provides little scattering; both result in low counting rates. There is also a range of source-detector spacings such that for formation densities normally encountered in borehole logging, counting rates increase with density. In addition, there are spacings larger than the last-mentioned spacings for which counting rates decrease with increasing density.

Before proceeding with a discussion of the selection of source-detector spacing, it may be helpful first to examine the significance of electron density measurements which may be made with the apparatus illustrated in FIGS. 1 and 2.

Figure 4:
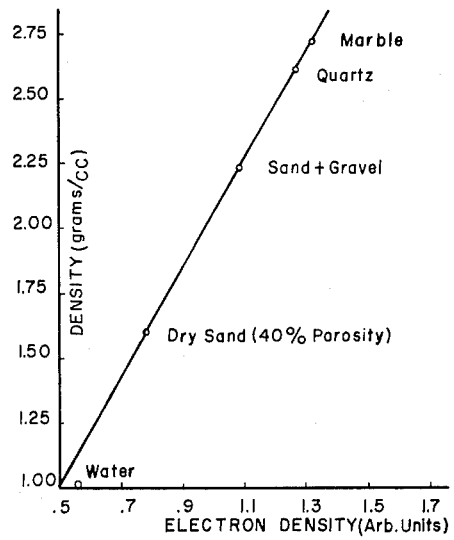
FIGS. 4 through 10 are graphs useful in explaining the effect of variations in source-detector spacing in apparatus arranged according to the invention.

It has been found that the dominant effect in obtaining a long with equipment of this type is that of Compton scattering, although the photoelectric effect at the K-shell energy and somewhat above may cause a small perturbation. The Compton effect depends only upon the electron density in a formation. Hence, it is important to establish the relationship of electron density, $\rho_e$, to the bulk density $\rho$. In FIG. 4, the mass density versus electron density for various formation materials is illustrated. However, in order to interpret the logs obtained with the apparatus of FIGS. 1–2, this must be examined in greater detail.

The number of atoms per unit volume, $\rho a$, (or the number of molecules, if the quantity $A$ is taken as the molecular rather than the atomic weight) is:

$$\rho a = \frac{N_o}{A} \rho \qquad (1)$$

where $N_o$=Avogadro's number and $A$=atomic weight of the element. If there are $Z$ (atomic number) electrons per atom, or molecule, as the case may require, from Equation 1, $$\rho e = Z \rho a = N_o \left(\frac{Z}{A}\right) \rho \qquad (2)$$

Now if a rock matrix, represented by $r$, is present having a porosity, $\phi$, and filled with a fluid, $f$, it may be shown from Equation 2 that $$\rho e = N_o \left[ \left(\frac{Z}{A}\right)_f \rho_f \phi + \left(\frac{Z}{A}\right)_r \rho_r (1-\phi) \right] \qquad (3)$$

or $$\rho e = N_o \left[ \rho_r \left(\frac{Z}{A}\right)_r - \phi \left\{ \rho_r \left(\frac{Z}{A}\right)_r - \rho_f \left(\frac{Z}{A}\right)_f \right\} \right] \qquad (4)$$

From Equation 4 it may be seen that the electron density is dependent only on the bulk density only if the quantity $(Z/A)$ is constant. The quantities $(Z/A)_f$ and $(Z/A)_r$, as used here, of course, represent the ratios of the $Z$ and $A$ for the molecules of the interstitial fluid and rock matrix, respectively, suitably averaged, if necessary. The assumption may be made that $(Z/A)$ is precisely ½ for all element (and thus all compounds), and the extent to which this is not true is a measure of the extent to which the electron density does not vary linearly with the bulk density of earth formations. Furthermore, an examination of Equation 4 indicates the extent to which various substitutions, such as oil for water in the pores of a formation, or limestone for sand as the matrix may perturb the log since each of these constituents is represented by the characterizing parameters, $(Z/A)$ and $\rho$. It is a fortuitous circumstance that the two most important constituents of rock matrices are $SiO_2$ and $CaCO_3$, both of which have $(Z/A)=$½ to which about 0.2%. Large variations in $(Z/A)$ among rock matrices would make the log useless for density determination since the response would then depend on the chemical nature of the formation as well as upon its bulk density. However, water ($H_2O$) and hydrocarbon $(CH_2)_n$, the principal interstitial fluids, have $(Z/A)$ values which are greater than ½ by about 10%, an amount which is appreciable in view of the accuracy with which the present type of log must be made in order to be useful practically.

Thus, the effect of deviations of $(Z/A)$ from ½ by taking the ratio of $\rho_e(Z/A)$ to $\rho_e($½$)$ using Equation 4 will be investigated. Measuring the rock matrix density in units of interstitial fluid density such that $$\rho'_r = \frac{\rho_r}{\rho_f} \qquad (5)$$

this ratio becomes:

$$\frac{\rho_e\left(\frac{Z}{A}\right)}{\rho_e(1/2)} = 2\left(\frac{Z}{A}\right)_r \frac{1-\phi\left[1-\frac{1}{\rho'_r}\frac{Z_f}{A_f}\frac{A_r}{Z_r}\right]}{1-\phi\left[1-\frac{1}{\rho'_r}\right]} \qquad (6)$$

In determining $\rho_e(Z/A)/\rho_e($½$)$ from Equation 6 it is assumed that $\rho_f = 1$ for both water and hydrocarbon. This introduces some error since the densities of these two are not exactly equal. Moreover, the density of water increases fairly rapidly with salinity and decreases fairly rapidly with increasing temperature. However, the calculated effect still represents the contribution due to $(Z/A)$ not being exactly ½.

Figure 5:
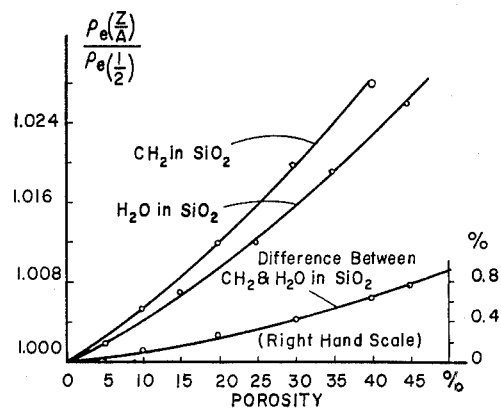

In FIG. 5, the plotted curves represent the ratio $\rho_e(Z/A)/\rho_e($½$)$ as a function of porosity for $H_2O$ in $SiO_2$ and $(CH_2)_n$ in $SiO_2$, calculated from the above Equation 6. It will be observed that if $\rho_e$ were truly independent of $(Z/A)$, the ratio $\rho_e(Z/A)/\rho_e($½$)$ would be a horizontal straight line having the value unity. Since the presence of H perturbs the situation, the nonlinearity of $\rho_e(Z/A)$ with $\rho$ increases with increasing porosity. However, it may be seen from FIG. 5 that the maximum value of this non-linearity is only 2.6% at a porosity of 45% for $H_2O$ in $SiO_2$. This is the highest porosity usually encountered in logging with apparatus embodying the present invention.

Figure 3:
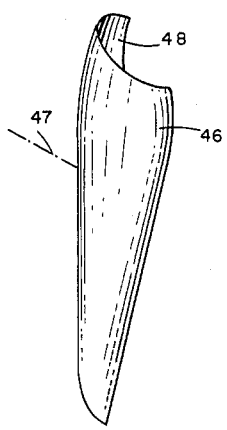
FIG. 3 is a perspective view of a portion of the apparatus shown in FIG. 2.

If the fluid and the matrix were perfectly arbitrary, this deviation from linearity could be significant since it has been found desirable to measure $\rho$ itself to within 2.5%. The non-linearity would then require a knowledge of the specific nature of the fluid before the density could be determined. However, since the fluid is usually known to fall in a limited class (either $(CH_2)_n$ or $H_2O$), there need be no concern with the proportionality of $\rho_e$ with $\rho$ so much as with the differences in degree of non-linearity as the fluid changes. Thus, in FIG. 5, there is shown another curve for $(CH_2)_n$ as the interstitial fluid and also the difference curve between $H_2O$ and $(CH_2)_n$. It may be seen that although $\rho_e$ is not rigorously proportional to $\rho$, it does stand in one-to-one correspondence independent of whether the fluid is $(CH_2)_n$ or $H_2O$, to within better than 0.8%, at least if the corrections for temperature, salinity, etc., mentioned above are ignored. The practical significance of this is that if the apparatus of FIGS. 1-3 is calibrated in $SiO_2+H_2O$, this calibration may be employed for $SiO_2+(CH_2)_n$ as well.

The next problem to be considered is the correlation of a density measurement with porosity of an earth formation, assuming a given interstitial fluid. It should be noted that this assumption need not be made since, as pointed out hereinbefore, even if the fluid changes from $H_2O$ to $(CH_2)_n$, $\rho_e$ does not change appreciably. Inasmuch as $CaCO_3$ and $SiO_2$ have practically identical $Z/A$ values, the only quantity on the right hand side of above-Equation 4 which differs for those two matrices is $\rho_r$. Rather than actually calculating $\rho_e$ for those two matrices, the difference, or the fractional change is $\rho_e$ for a given fractional change in $\rho_r$, will provide significant information. Differentiating Equation 4 with respect to $\rho_r$ and dividing by $\rho_r$ leads to $$\frac{\Delta\rho_e}{\rho_e} = \left[\frac{1-\phi}{1-\phi\left\{1-\frac{Z_f}{A_f}\frac{A_r}{Z_r}\frac{1}{\rho'_r}\right\}}\right]\frac{(\Delta\rho_r)}{\rho_r} \quad (7)$$

The factor in the brackets of Equation 7 may be recognized as the fractional change in electron density per unit fractional change in bulk density of the rock matrix as a function of porosity. The quantity $$\frac{\Delta\rho_r}{\rho_r}$$

may be taken as the fractional difference in density between a limestone matrix and a sandstone matrix, which is 0.022.

Figure 6:
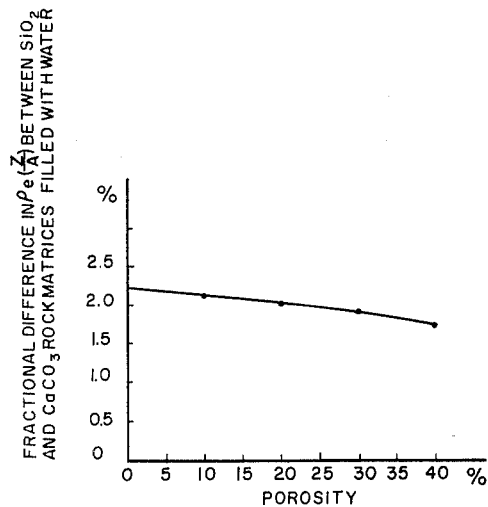

In FIG. 6, there is shown a curve representing the fractional change in electron density as a function of porosity. It is evident that over the illustrated porosity range of interest, there is very little variation in the difference between $\rho_e(SiO_2)$ and $\rho_e(CaCO_3)$ and the mean difference itself is only 2.0%.

Thus in practice, the apparatus of FIGS. 1-2 may be calibrated, for example in $SiO_2+H_2O$ to determine the porosity response and this calibration may then be corrected very simply for use in limestone formations. The correction may be carried out in the following fashion. Equation 4 is differentiated with respect to $\phi$ and by transposing and dividing by $\rho_e$ the following relation is obtained $$d\phi = \left[\phi - \frac{1}{1-\frac{Z_f}{A_f}\frac{A_r}{Z_r}\frac{1}{\rho'_r}}\right]\frac{d\rho_e}{\rho_e} \quad (8)$$

which expresses the shift in porosity with a given fractional shift in $\rho_e$. The fractional shift in $\rho_e$ may be taken as the fractional difference brought about by replacing $SiO_2$ with $CaCO_3$, using the result of Equation 7. Stated another way, whereas Equation 7 gives the change in electron density due to a change in bulk density of the rock matrix, it is desirable to convert this into the corresponding apparent change in porosity. Substitution of the appropriate numbers in Equation 8 yields $$\Delta\phi = -(1.70-\phi)\frac{\Delta\rho_e}{\rho_e} \quad (9)$$

It was shown earlier that $$\frac{\Delta\rho_e}{\rho_e} \approx 0.02$$

for the case of a change of matrix from $SiO_2$ to $CaCO_3$. Hence, a zero porosity sandstone will give the same response as a 3.4% porosity limestone, a 20% porous sand will appear as a 23% porous limestone, and a 40% porous sand will look like a 42.6% porous limestone. An average correction of 0.03 porosity units may then be employed in such a fashion that if the formations were known to be a limestone and the apparatus has been calibrated in sandstones, the porosity may be read from the calibration curve and then 0.03 porosity units added. The correction is small for the small differences in $\rho_r$ found in earth formations and is well defined. Consequently, a fairly unique value of porosity may be determined.

The significance of this analysis lies in the fact that, if Compton effect is the dominant form of interaction with the formation, the electron density is the only quantity of significance. The energy of the source included in the apparatus of FIGS. 1 and 2 may be selected so that this condition is satisfied. Accordingly, apparatus embodying the present invention may be employed to obtain a log which is accurately representative of formation density as a function of depth in the borehole.

Figure 7:
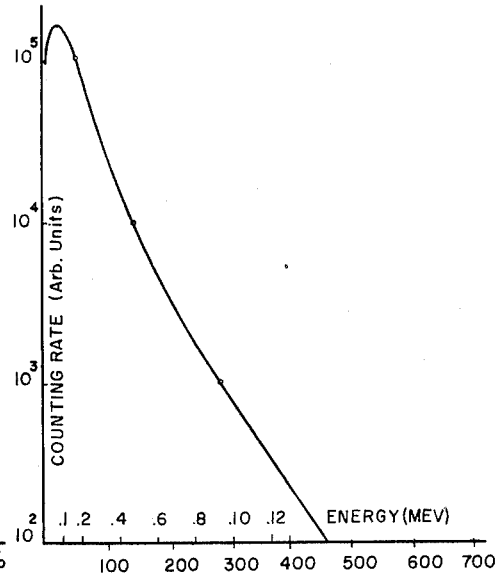

In experiments intended to determine the best spacing between the source and detector, as well as other characteristics of the apparatus described herein, a scintillation element 1½" in diameter and 2" long was employed and the output of photomultiplier 35 was coupled to a conventional single channel pulse height analyzer. FIG. 7 illustrates a typical pulse amplitude spectrum, which as is well-known is representative of the energy of intercepted gamma radiation. There is shown an increase in photon flux due to Compton scattering buildup effect as energy decreases until, in the vicinity of 100 kev., photoelectric absorption begins to appear, causing a maximum in the spectrum, followed by a sharp decrease as the curve proceeds to still lower energies.

In the experiments to be described, laboratory type formations were employed including limestone with a six inch borehole, and sand plus water with a range of borehole sizes. The densities of these formations are illustrated in FIG. 4 where a realistic range of densities (2.0–2.7 gms./cc.) is included. Borehole fluids employed afforded a realistic density range from 1.0 to 2.0 gms./cc. With this experimental set-up various S–D spacings were utilized yielding ratios of counting rates observed in the two formations ranging from 1.7 to 2.4 as the S–D spacing was increased from 24 cms. to 40 cms. These ratios were obtained with a cobalt 60 source and, as pointed out hereinafter, even larger ratios are obtainable with lower energy sources.

Figure 8:
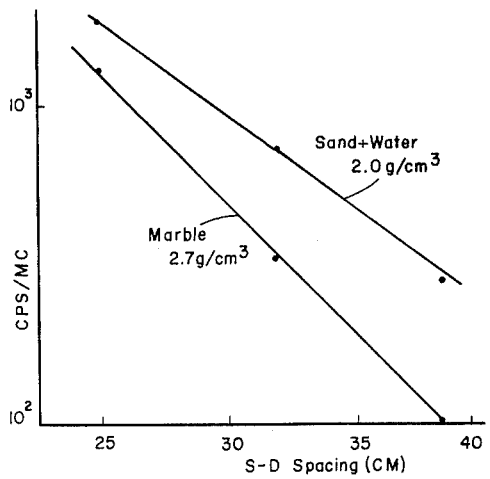

It will be observed from FIG. 8, which summarizes the data, that resolution, or the degree to which variations in density may be indicated varies directly with spacing, but the counting rate decreases quite markedly with spacing.

Figure 9:
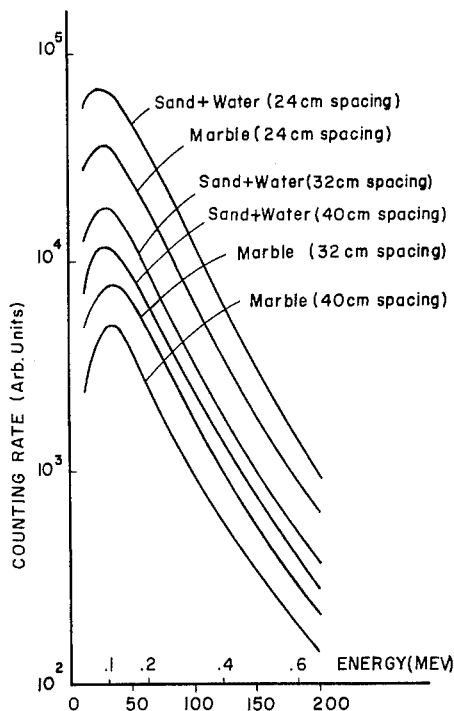

Additional differential pulse height distributions obtained by using a cobalt 60 source recessed ⅔" behind face 21 (FIG. 2) and recording the gamma radiation above 70 kev. are included in FIG. 9 wherein the various curves, illustrative of certain formations and S–D spacings, are plotted in terms of counting rate versus pulse height. An approximate energy scale is shown in FIGS. 8 and 9 for purposes of orientation.

Of course, counting rate may be raised by increasing the strength of the source. However, consideration of cost and health hazard make the use of a low source strength very desirable. In addition, the sidewall-engaging face of instrument 16 (FIG. 2) may not be of excessive length since its association with the sidewall of the borehole may be adversely affected thereby leading to undesirable perturbations in the log caused by varying amounts of drilling mud in front of face 21. With these considerations in view, an S–D spacing of 15 inches for an approximately fifty millicurie cobalt 60 source may be preferable.

It was noted that by setting the equipment to accept gamma rays above 45 kev. the counting rate was increased 50% without changing the resolution appreciably. If a level of 200 kev. is employed, counting rate is reduced by approximately a factor of two. These results may be anticipated from the data of FIG. 9.

An approximation of the radius of investigation at an S–D spacing of 32 cm. was made by successively increasing the radius of a low density laboratory formation outside a borehole. The results of this experiment are included in Table I,

*Table I*

| Formation radius beyond borehole | Total counting rate (Arbitrary units) |
| --- | --- |
| 1½″ | 261 |
| 2½″ | 401 |
| 3½″ | 590 |
| 7″ | 865 |

It is evident from the data of Table I that more than one-half the total counting rate is contributed by material more than 2½″ from the sidewall of the borehole. This fact is significant since it has been shown experimentally that sidewall devices of this type suggested heretofore have radii of investigation very much less than this, a fact which makes them nearly useless for formation density logging.

Figure 10:
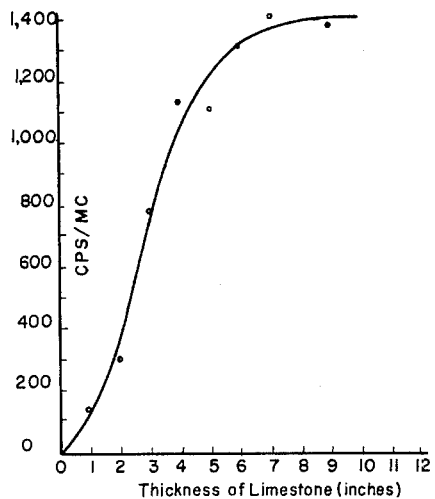

Another more refined experiment was performed using varying thicknesses of limestone and a 38.5 cm. S–D spacing. The results are plotted along a curve in FIG. 10 which indicates a depth of investigation between two and six inches.

All of the measurements described above showing improved sensitivity and greater depth of investigation with increased source-detector spacing were performed with cobalt 60 source. As is well known, this source emits gamma radiation at energies of 1.17 and 1.33 mev., having an average of 1.25 mev., and is substantially equivalent in average source energy to the usual radium source utilized in gamma ray logging.

Although it might readily be assumed higher source energies should be utilized for increased source-detector spacings and greater depths of investigation and that at a given source-detector spacing the same density resolution would be obtained for all source energies, in fact, experiment has shown that, particularly at large source-detector spacings, the density resolution may be further improved by decreasing the energy of the gamma radiation. In a typical case, cobalt 60 was first utilized as a source and a spectrum analyzing gamma ray detector derived the curves shown in FIG. 11 for high and low density formation materials. An assumed bias level is illustrated in this figure by the vertical line denoted "bias" to show how the discriminator 56 of FIG. 1A may be adjusted to eliminate extraneous noise pulses. Preferably, this level coincides with the energy of the minimum counting rates in the curves, as illustrated in the drawings. The ratio of the cross-hatched area enclosed by the low and high density curves and the area under one of these curves defines the resolution of the apparatus.

Figure 11:
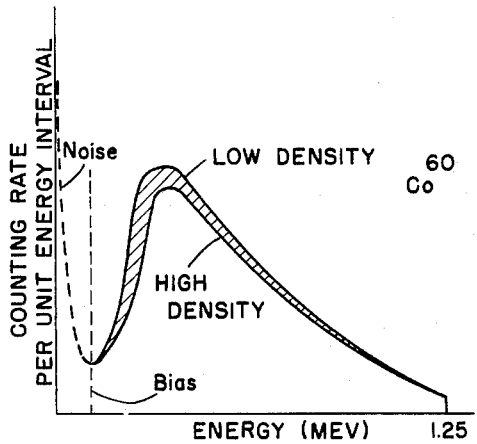
FIGS. 11 through 14 are graphs which are helpful in explaining the variations in density resolution with source energy.
Figure 12:
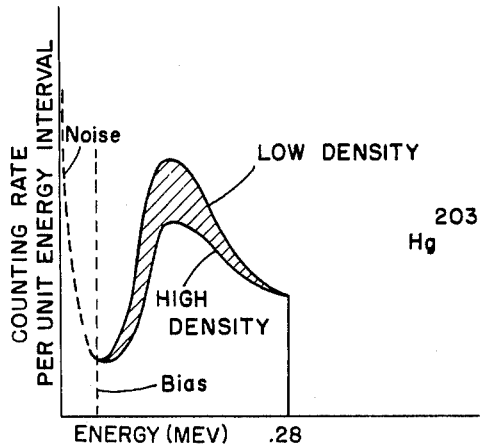

In FIG. 12, the same type of illustration is employed for an $Hg^{203}$ source emitting 0.28 mev. gamma radiation and the density resolution is defined in the same manner as in FIG. 11. A visual comparison of these two figures readily illustrates that the apparatus utilizing the lower energy source provides increased resolution.

In order to explain the improvement in density resolution with decreased gamma ray energies, it should be pointed out that in order to detect density variations with high sensitivity the counting rate at the position of the detector should be highly dependent on the density of the intervening formation. In the case of gamma-gamma logging, the detector counting rate is an exponential function of the density of the intervening medium and corresponds to the transmission through the intervening medium. Thus, when the transmission is low, as occurs with low energy source and at large source-detector spacings, the sensitivity of the counting rate to the argument of the exponential, which is the formation density, is high.

Figure 13:
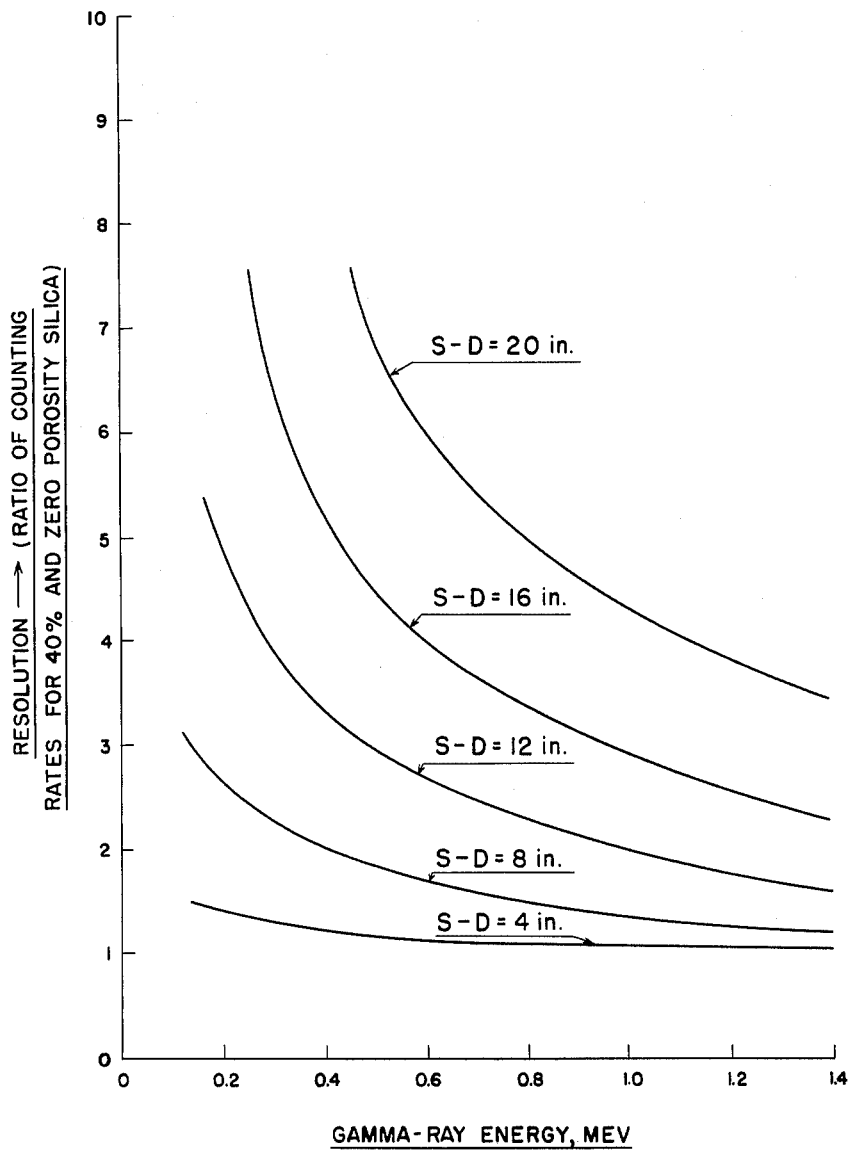

In the graph of FIG. 13, this dependence of density resolution on source-detector spacing and gamma ray energy is illustrated by a family of theoretically calculated curves, each representing at a particular source-detector spacing the change in the ratio of counting rates for 40% and zero porosity silica with varying gamma ray energy. As indicated in the graph, for each source-detector spacing the resolution increases as the gamma ray energy decreases and with increased source-detector spacings substantially improved resolution is obtained for each gamma ray energy. Furthermore, it will be noted that the major portion of the improvement in resolution takes place with gamma ray energies below 1 mev., indicating that maximum sensitivity and precision of measurement cannot be obtained with the usual radium and cobalt 60 gamma ray sources which emit gamma rays of greater than 1 mev. energy.

As pointed out above and mentioned in the Russell patent, No. 2,469,461, reflection or scattering of gamma rays becomes increasingly important at small source-detector spacings and density variations may be indicated to a certain degree with equipment utilizing a source-detector spacing less than the critical cross-over value at which the scattering effect balances the absorption effect, that is, spacings at which the counting rate ratio, as shown in FIG. 13, is less than unity. It will be apparent, however, that this ratio reaches a finite minimum value at zero source-detector spacing, imposing an upper limit on the theoretically possible resolution and, furthermore, that practical considerations such as the impossibility of utilizing a coincident source and detector and the necessity for shielding between the two further limit the obtainable resolution to a relatively low value. Accordingly, there always exists for any given source energy an infinite range of long source-detector spacings which will provide greater density resolution than the highest possible at shorter spacings.

From an examination of the family of curves shown in FIG. 13 for source-detector spacings from 4 inches through 20 inches, one might wish to select the lowest energy gamma ray source available in order to obtain the highest density resolution consistent with reasonably small source size and the largest possible source-detector spacing. Although increased source-detector spacings require substantially higher source intensities, the typical sources listed hereinafter are relatively inexpensive and simple to handle so that there is no absolute upper limit to the source-detector spacings other than structural considerations.

On the other hand, an important limitation is imposed on the low end of the possible source energy range by the onset of the matrix effect. This effect stems from differences in the K-shell gamma ray photoelectric absorption tails in silicon and calcium which become more pronounced, as do the differences between them, as the source energy is lowered. At a source energy of 250 kev., the effect is quite large and below that value it interferes substantially with the precision of density resolution measurements when both silicon and calcium are present. Thus, to avoid the effect it may be desirable to select a source emitting gamma rays of greater than 250 kev. energy. Also, as a practical matter, the half-life of the source should be sufficiently long to prevent substantial source intensity variations during a series of measurements. The following table lists a group of typical isotopes which are low energy gamma ray emitters suitable for use with the invention. It will be understood that the following is not an exhaustive list and that other suitable isotopes emitting gamma rays within the same energy range may be utilized in the invention.

*Table II*

| Isotope | Half Life | Energies and Intensities of Principal Gamma Rays |
|---|---|---|
| $Hg^{203}$ | 46 D | 280 kev. (100%). |
| $Cs^{137}$ | 30 Y | 663 kev. (88%). |
| $Sb^{125}$ | 2.7 Y | 601, 425, 175 kev. and others. |
| $Ir^{192}$ | 70 D | Average ~350 kev. |
| $Zr^{95}$ | 65 D | 708 kev. (98%). |
| $Cd^{115}$ | 43 D | ~500 kev. |
| $Nb^{95}$ | 35 D | 760 kev. |
| $Ba^{140}$ | 12.8 D | 540 kev. |
| $Se^{75}$ | 127 D | 402 kev. (15%), 280 kev. (28%), 265 kev. (61%), and others. |
| $Hf^{181}$ | 46 D | 481 kev. (70%), 345 kev. (30%), 136 kev. (30%), 133 kev. (100%). |
| $Ru^{103}$ | 42 D | 494 kev. (94%), others. |
| $Ce^{141}$ | 32.5 D | 141 kev. (70%), 315 kev. |
| $Cr^{51}$ | 26.5 D | 320 kev. (8%). |
| $Be^{7}$ | 54 D | 480 kev. (11%). |

Figure 14:
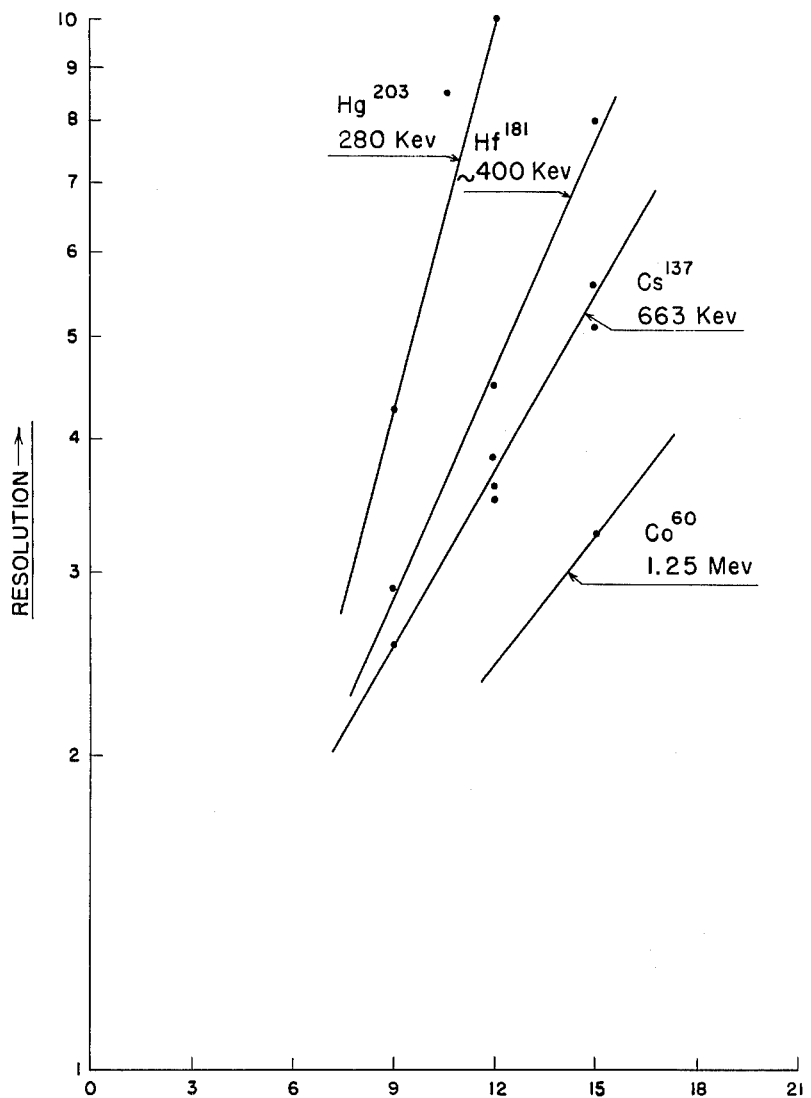

A logarithmic plot of resolution versus spacing for representative sources in the group listed above is shown in the graph of FIG. 14. As illustrated therein, the resolution obtained by using gamma rays from a $Cs^{137}$ source having an energy of 663 kev. is nearly twice that obtained with the cobalt 60 source. Although a $Hg^{203}$ source provides substantially higher resolution, it is, to a certain extent, subject to the matrix effect described above and thus leads to inaccuracies where both calcium and silicon are present in varying degrees. Also, along with $Hf^{181}$, it has a half-life of only 46 days as compared with 30 years for $Cs^{137}$. For these reasons, $Cs^{137}$ has been preferred in certain applications not requiring the maximum possible resolution, but other gamma ray sources having energy within the range of about 250 to 1000 kev. may be preferred in other applications. For example, where very high resolution is desired and the matrix effect in the formation is low, $Hg^{203}$ could be utilized. If there is a strong matrix effect and greater resolution than that obtainable with $Cs^{137}$ is desired, $Hf^{181}$ might be selected.

Figure 15:
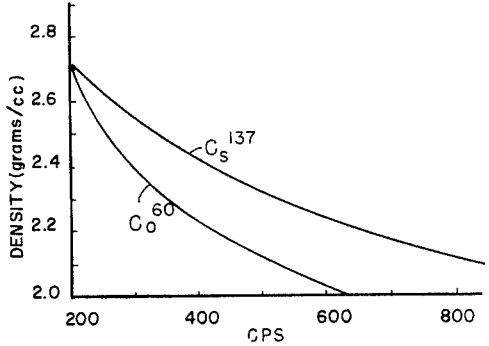
FIG. 15 is a graph illustrating a typical calibration curve for the apparatus of FIGS. 1 and 2.

FIG. 15 represents typical calibration curves for the apparatus illustrated in FIGS. 1 and 2 plotted in terms of density in grams per cm.³ versus counts per second utilizing $Co^{60}$ and $Cs^{137}$ sources. From these curves, it may be seen that even with the high energy $Co^{60}$ source, because of its source-detector spacing, the apparatus provides high resolution since there is a large change in counting rate for a relatively small density variation. Furthermore, it is readily apparent that the resolution is substantially higher with the low energy $Cs^{137}$ source. Accordingly, small uncertainties in counting rate due to either statistical fluctuations or systematic causes, such as mud cake, mud density, etc., do not appreciably reduce the accuracy of the density measurements. It is, therefore, apparent that gamma ray logging apparatus constructed in accordance with the present invention affords greater accuracy than heretofore attainable.

Although specific gamma ray sources have been enumerated above in Table II, obviously any other relatively low energy gamma ray source, whether of the naturally radioactive type or wherein gamma radiation is generated through the acceleration of particles prior to impingement on a suitable target material, may be utilized to provide improved density resolution according to the invention. Moreover, other detectors may be employed. For example, an ionization chamber may be suitably arranged for use in the apparatus embodying the invention.

Although the invention has been described herein with reference to specific embodiments, many modifications and variations therein will readily occur to those skilled in the art. Accordingly, all such modifications and variations are included within the intended scope of the invention as defined by the following claims.

We claim:

1. Apparatus for investigating earth formations traversed by a well or borehole comprising an instrument adapted to be passed through the borehole and including a wall-engaging face; means for maintaining said wall-engaging face in engagement with the sidewall of the borehole; a source of gamma radiation, having an energy of at least 250 kev. but no greater than 800 kev. so that a high density resolution resulting from low transmission in formation material occurs, supported within said instrument in the vicinity of said wall-engaging face; and a detection system including a gamma-ray-responsive device supported within said instrument in the vicinity of said wall-engaging face and in longitudinally spaced relation from said source relative to the axis of the borehole.

2. Apparatus for investigating earth formations traversed by a well or borehole comprising an instrument adapted to be passed through the borehole and including a wall-engaging face; means for maintaining said wall-engaging face in engagement with the sidewall of the borehole; a source of gamma radiation composed of radioactive mercury 203 having an energy such that a high density resolution resulting from low transmission in formation material occurs, said source being supported within said instrument in the vicinity of said wall-engaging face; and a detection system including a gamma-ray-responsive device supported within said instrument in the vicinity of said wall-engaging face and in longitudinally spaced relation from said source relative to the axis of the borehole.

3. Apparatus for investigating earth formations traversed by a well or borehole comprising an instrument adapted to be passed through the borehole with a face maintained in contact with the sidewall of the borehole, a source of gamma radiation adjacent the face emitting gamma rays having an energy of at least 250 kev. but substantially all of which have energy no greater than 800 kev., and a detection system including a gamma ray responsive device supported within the instrument and spaced from the source.

4. Apparatus for investigating earth formations traversed by a well or borehole comprising an instrument adapted to be passed through the borehole with a face maintained in contact with the sidewall of the borehole, a source of gamma radiation adjacent the face emitting gamma rays having an energy of at least 250 kev. but substantially all of which have an energy less than 800 kev., and a detection system including a gamma-ray-responsive device supported within the instrument and spaced from the source by at least four inches.

5. Apparatus for investigating earth formations traversed by a well or borehole comprising an instrument adapted to be passed through the borehole with a face maintained in contact with the sidewall of the borehole, a source of gamma radiation adjacent the face emitting gamma rays having an energy of at least 250 kev. but substantially all of which have an energy less than 800 kev., and a detection system including a gamma-ray-responsive device biased to detect gamma rays having energy greater than about 45 kev. supported within the instrument and spaced from the source by at least twelve inches.

6. Apparatus for investigating earth formations traversed by a well or borehole comprising an instrument adapted to be passed through the borehole with a face maintained in contact with the sidewall of the borehole, a source of gamma radiation adjacent the face emitting gamma rays having an energy of at least 250 kev. but substantially all of which have an energy less than 800 kev., and a detection system including a gamma-ray-responsive device supported within the instrument and spaced from the source by a distance of twelve to twenty inches.

7. Apparatus for investigating earth formations traversed by a well or borehole comprising an instrument adapted to be passed through the borehole with a face maintained in contact with the sidewall of the borehole, a source of gamma radiation adjacent the face emitting gamma rays substantially all of which have an energy within the range of 250 to 800 kev., and a detection system including a gamma-ray-responsive device supported within the instrument relatively close to said face and spaced from the source by at least twelve inches.

8. Apparatus for investigating earth formations traversed by a well or borehole comprising an instrument adapted to be passed through the borehole with a face maintained in contact with the sidewall of the borehole, a source of gamma radiation adjacent the face emitting gamma rays substantially all of which have an energy within the range of 250 to 800 kev., and a detection system including a gamma-ray-responsive device supported within the instrument relatively close to said face and spaced from the source by a distance of twelve to twenty inches.

9. Apparatus for subsurface investigations in a well or borehole comprising an instrument adapted to be passed through the borehole and including a wall-conforming face; resilient means carried by said instrument for positioning the same with respect to the sidewall of the borehole; a source of gamma radiation having an energy substantially less than 800 kev. and greater than 250 kev. supported within said instrument in the vicinity of said wall-conforming face; a detection system including a gamma-ray responsive device supported within said instrument in the vicinity of said wall-conforming face and spaced longitudinally from said source a distance exceeding the critical source-detector spacing whereby the gamma rays to which said device responds decrease with increasing density of the media traversed by such gamma rays; and gamma-ray shielding means included in said instrument having one portion intermediate said source and said gamma-ray responsive device and another portion substantially enclosing said source of gamma radiation with the exception of an essentially gamma-ray-transparent aperture adjacent to said wall-conforming face.

10. Apparatus for logging to determine the density of formations exposed in a well bore which comprises an elongated housing adapted to be passed through a well bore, a detector of gamma rays in said housing, a concentrated source of gamma rays spaced from said detector by a fixed distance of at least about 15 inches, dense shielding material substantially surrounding said source and said detector on all sides except one side which is adapted to be held against a well wall, said source being within a recess approximately ⅔ inch in depth in said shielding, spring means for maintaining said one side of said detector and the opening of said recess substantially in contact with a well wall, and means coupled to said detector for recording an indication of the intensity of the gamma rays received from said source.

11. Apparatus for logging to determine the density of formations exposed in a well bore which comprises an elongated housing adapted to be passed through a well bore, a detector of gamma rays in said housing, a concentrated source of gamma rays spaced from said detector by a fixed distance of between about 15 and 24 inches, dense shielding material substantially surrounding said source and said detector on all sides except one side which is adapted to be held against a well wall, said source being within a recess between about ½ and 2 inches in depth in said shielding, spring means for maintaining said one side of said detector and the opening of said recess substantially in contact with a well wall, and means coupled to said detector for recording an indication of the intensity of the gamma rays received from said source.

12. Apparatus for investigating earth formations traversed by a well or borehole comprising an instrument adapted to be passed through the borehole and including a wall-engaging face and a recess extending from said face; means for maintaining said wall-engaging face in engagement with the sidewall of the borehole; a source of gamma radiation, having an energy of at least 250 kev. but no greater than 800 kev. so that a high density resolution resulting from low transmission in formation material occurs, supported within said recess in the vicinity of said wall-engaging face; and a detection system including a gamma-ray-responsive device supported within said instrument in the vicinity of said wall-engaging face and in longitudinally spaced relation about fifteen inches from said source relative to the axis of the borehole.

13. Apparatus for investigating earth formations traversed by a well or borehole comprising an instrument adapted to be passed through the borehole and including a wall-engaging face and a recess extending from said face; means for maintaining said wall-engaging face in engagement with the sidewall of the borehole; a source of gamma radiation, having an energy of at least 250 kev. but no greater than 800 kev. so that a high density resolution resulting from low transmission in formation material occurs, supported within said recess about one-half inch back of said wall-engaging face; and a detection system including a gamma-ray-responsive device supported within said instrument in the vicinity of said wall-engaging face and in longitudinally spaced relation about fifteen inches from said source relative to the axis of the borehole.

14. Apparatus for investigating earth formations traversed by a well or borehole comprising an instrument adapted to be passed through the borehole and including a wall-engaging face and a recess extending from said face; means for maintaining said wall-engaging face in engagement with the sidewall of the borehole; a source of gamma radiation composed of cesium 137 having an energy of at least 250 kev. but no greater than 800 kev. so that a high density resolution from low transmission in formation material occurs, supported within said recess in the vicinity of said wall-engaging face; means for releasably securing said source in said recess; and a detection system including a gamma-ray-responsive device supported within said instrument in the vicinity of said wall-engaging face and in longitudinally spaced relation about fifteen inches from said source relative to the axis of the borehole, said wall-engaging face including an aluminum window opposite said gamma-ray-responsive device.

15. Apparatus for investigating earth formations traversed by a well or borehole comprising an instrument adapted to be passed through the borehole and including a wall-engaging face and a recess extending from said face; means for maintaining said wall-engaging face in engagement with the sidewall of the borehole; a source of monoenergetic gamma radiation, having an energy of at least 250 kev. but no greater than 800 kev. so that a high density resolution resulting from low transmission in formation material occurs, supported within said recess in the vicinity of said wall-engaging face; and a detection system including a gamma-ray-responsive device supported within said instrument in the vicinity of said wall-engaging face and in longitudinally spaced relation about fifteen inches from said source relative to the axis of the borehole.

16. Apparatus for investigating earth formations traversed by a well comprising a housing and a wall engaging skid supported thereby adapted to be passed through a well with a face of said skid maintained in contact with the sidewall of the well, a source of gamma radiation adjacent the face emitting gamma rays having an energy of at least 250 kev. but substantially all of which have an energy no greater than 800 kev., and a detection system including a gamma responsive device supported within said skid close to said face and spaced from said source by at least 4 inches.

17. Apparatus for investigating earth formations traversed by a well comprising an instrument adapted to be passed through the well with a face maintained in contact with a sidewall of the well, a source of gamma radiation adjacent the face emitting gamma rays having an energy of at least 250 kev. but substantially all of which have an energy no greater than 800 kev., and a detection system including a gamma ray responsive device for selectively detecting gamma rays having energy greater than about 45 kev. supported within said instrument and spaced from said source.

18. Apparatus for subsurface investigations in a well or borehole comprising an instrument adapted to be passed through the well and having a generally cylindrical face; means carried by said instrument for positioning the same with respect to the sidewall of the well; a source of gamma radiation having an energy substantially less than 800 kev. and greater than 250 kev. supported within said instrument in recessed relation to the face of said instrument; a detection system including a gamma-responsive device supported within said instrument in the vicinity of said face and spaced longitudinally from said source a distance exceeding the critical source-detector spacing whereby the gamma rays to which said device responds decrease with increasing density of the media traversed by such gamma rays; and gamma-ray shielding means included in said instrument having one portion intermediate said source and said gamma ray responsive device and another portion substantially enclosing said source of gamma radiation with the exception of an essentially gamma-ray-transparent aperture adjacent to said face.

19. Apparatus for logging to determine the density of formations exposed in a well bore which comprises an elongated housing and a skid supported thereby adapted to be passed through a well bore, a detector of gamma rays in said skid, a concentrated source of gamma rays in said skid spaced from said detector by a fixed distance of at least about 15 inches, dense shielding material substantially surrounding said source and said detector on all sides except one side which is adapted to be held against a well wall, said source being recessed in such shielding from said one side about ½ inch, means for maintaining said one side of said skid substantially in contact with a well wall, and means coupled to said detector for deriving indications of the intensity of the gamma rays received from said source.

References Cited by the Examiner
UNITED STATES PATENTS

| | | | |
|---|---|---|---|
| 2,469,461 | 5/1949 | Russell | 250—83.6 |
| 2,711,482 | 6/1955 | Goodman | 250—71 |
| 2,727,155 | 12/1955 | Herzog et al. | 250—83.6 |
| 2,761,977 | 9/1956 | McKay | 250—83.6 |
| 2,934,652 | 4/1960 | Caldwell et al. | 250—83.6 |

OTHER REFERENCES

Pocket Encyclopedia of Atomic Energy, edited by Frank Gaynor, published in 1950 by Philosophical Library Inc., New York, N.Y., pages 82 to 102.

RALPH G. NILSON, *Primary Examiner.*

A. R. BORCHELT, *Assistant Examiner.*